(12) United States Patent
Baumgartner et al.

(10) Patent No.: US 8,037,976 B2
(45) Date of Patent: Oct. 18, 2011

(54) DISC BRAKE, IN PARTICULAR FOR A UTILITY VEHICLE

(75) Inventors: Johann Baumgartner, Moosburg (DE); Robert Trimpe, Wessling (DE); Rudolf Fischer, Erding (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/429,716

(22) Filed: Apr. 24, 2009

(65) Prior Publication Data

US 2009/0260928 A1 Oct. 22, 2009

Related U.S. Application Data

(63) Continuation of application No. PCT/EP2007/061351, filed on Oct. 23, 2007.

(30) Foreign Application Priority Data

Oct. 24, 2006 (DE) .......................... 10 2006 050 647

(51) Int. Cl.
*F16D 55/00* (2006.01)
*F16D 65/14* (2006.01)

(52) U.S. Cl. ............... 188/73.31; 188/73.43; 188/73.44; 188/73.45

(58) Field of Classification Search ............... 188/73.31, 188/73.43, 73.44, 73.45
See application file for complete search history.

(56) References Cited

U.S. PATENT DOCUMENTS

| 3,326,562 | A | * | 6/1967 | Deuring | 277/502 |
|---|---|---|---|---|---|
| 4,051,927 | A | * | 10/1977 | Karasudani | 188/73.44 |
| 4,458,790 | A | * | 7/1984 | Hoffman et al. | 188/71.8 |
| 4,570,760 | A | * | 2/1986 | Schmidt | 188/73.44 |
| 4,577,731 | A | * | 3/1986 | Burgdorf et al. | 188/73.33 |

(Continued)

FOREIGN PATENT DOCUMENTS

CA 2 578 982 A1 3/2006

(Continued)

OTHER PUBLICATIONS

International Search Report dated Mar. 2, 2008 w/English translation (four (4) pages).

*Primary Examiner* — Bradley King
*Assistant Examiner* — Mahbubur Rashid
(74) *Attorney, Agent, or Firm* — Crowell & Moring LLP

(57) ABSTRACT

A disc brake for a utility vehicle, having a brake caliper which encompasses a brake disc and which is fastened, so as to be axially movable in relation to the brake disc, to a positionally fixed brake carrier by means of two fastening elements, wherein the fastening elements have in each case one guide bar which is fixedly connected to the brake carrier, of which guide bars, for the axial mobility of the brake caliper, one in guided in a plain bearing which is designed as a fixed bearing and the other is guided in a plain bearing which is designed as a floating bearing, wherein at least the floating bearing has a guide sleeve, which engages around the guide bar and which is connected to the brake caliper so as to be fixed in terms of movement, with an elastomer bearing sleeve, and the guide bar is covered, on its end side facing away from the brake disc, by means of a cap, is designed such that the cap, while covering the guide sleeve at the end side, is fastened at least in one axial partial region to the elastomer bearing sleeve.

10 Claims, 3 Drawing Sheets

U.S. PATENT DOCUMENTS

Figure 1:
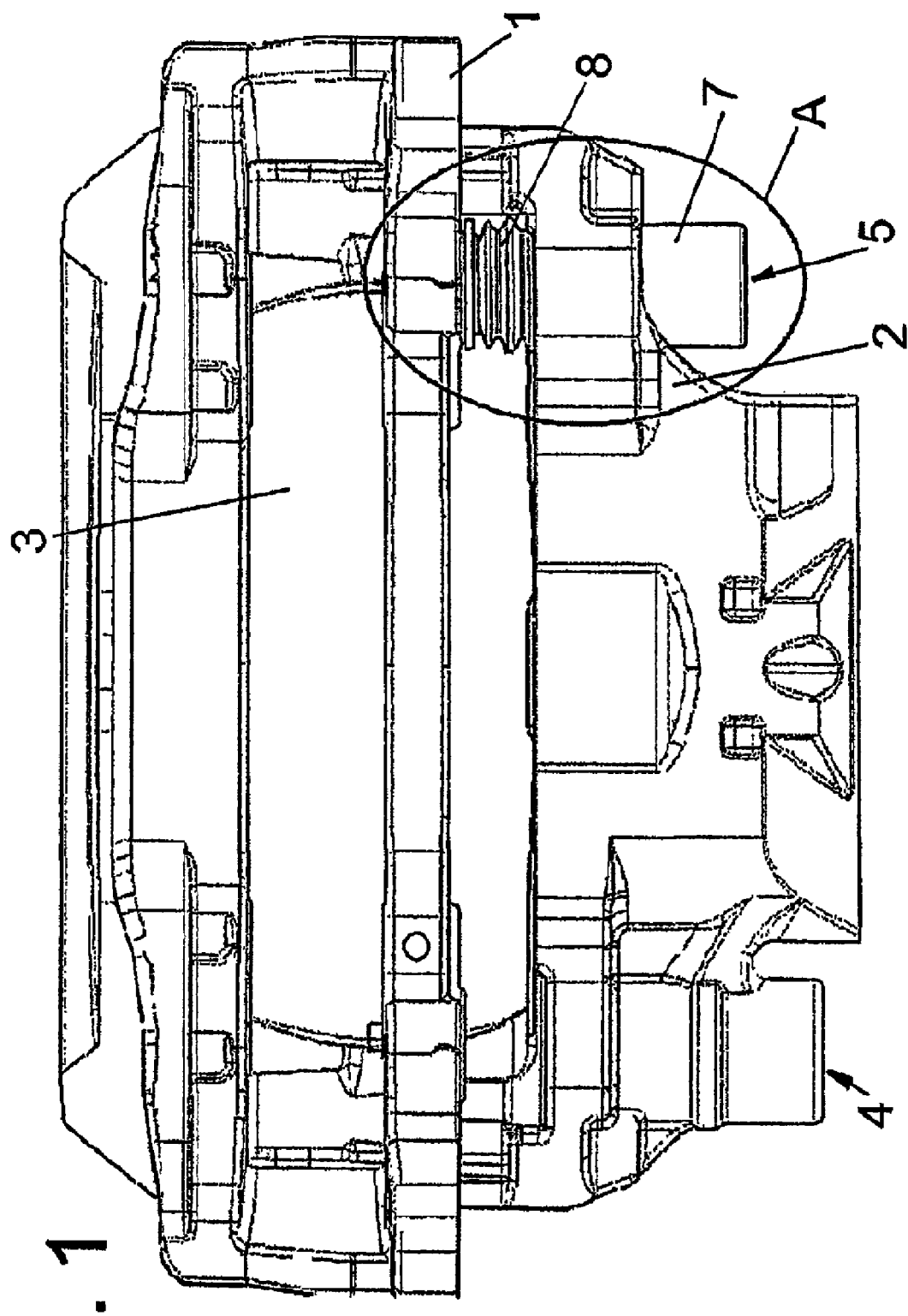

| | | | |
|---|---|---|---|
| 4,662,484 A * | 5/1987 | Adachi et al. | 188/73.45 |
| 4,709,789 A * | 12/1987 | Czich et al. | 188/73.44 |
| 4,768,626 A | 9/1988 | Le Delt et al. | |
| 5,036,957 A * | 8/1991 | Fouilleux et al. | 188/73.44 |
| 5,040,642 A * | 8/1991 | Gregoire et al. | 188/73.44 |
| 5,052,526 A * | 10/1991 | Weiler et al. | 188/73.44 |
| 5,193,652 A * | 3/1993 | Thiel et al. | 188/73.31 |
| 2007/0084680 A1 * | 4/2007 | Macke et al. | 188/73.44 |

FOREIGN PATENT DOCUMENTS

| | | |
|---|---|---|
| DE | 102 45 027 A1 | 4/2004 |
| EP | 0 253 707 A2 | 1/1988 |
| JP | 57-12131 A | 1/1982 |
| WO | WO 9401693 A1 * | 1/1994 |
| WO | WO 2006/024513 A1 | 3/2006 |

\* cited by examiner

DISC BRAKE, IN PARTICULAR FOR A UTILITY VEHICLE

CROSS-REFERENCE TO RELATED APPLICATIONS

This application is a continuation of PCT International Application No. PCT/EP2007/061351, filed Oct. 23, 2007, which claims priority under 35 U.S.C. §119 to German Patent Application No. DE 10 2006 050 647.2, filed Oct. 24, 2006, the entire disclosures of which are herein expressly incorporated by reference.

BACKGROUND AND SUMMARY OF THE INVENTION

The invention relates to a disc brake and, in particular, to a disc brake for a utility or commercial vehicle having a brake caliper, which surrounds a brake disc and which is fastened to a positionally fixed brake carrier by two fastening elements so as to be axially movable in relation to the brake disc. The fastening elements have, in each case, one guide bar which is fixedly connected to the brake carrier. For the axial mobility of the brake caliper, one guide bar is guided in a plain bearing, which is embodied as a fixed bearing, and the other guide bar is embodied as a floating bearing.

In such disc brakes, which are used predominantly in heavy utility or commercial vehicles, the brake caliper, which is also referred to as a sliding caliper, is connected to the vehicle-mounted brake carrier by way of fastening elements. Here, guide bars engage into the brake carrier, which guide bars are guided at the other side in plain bearings of the brake caliper, so as to enable an axial movement, in relation to the brake disc, of the brake caliper with respect to the positionally fixed brake carrier.

One of the plain bearings is designed as a fixed bearing with a small amount of sliding play, while the other plain bearing functions as a floating bearing, as a result of which in particular production tolerances are compensated.

Here, it has proven to be expedient to use a guide bush in the floating bearing, which guide bush has a bearing sleeve composed of an elastomer and held in the brake caliper so as to be immovable. In addition to low production costs, a guide bush of this type is characterized by a certain degree of robustness, and simple assembly. Furthermore, operational rattling noises are prevented by the elastomer bearing sleeve.

To protect the guide bar and the sliding surfaces which are formed together with the guide bush, it is known to cover the guide bar, on its end side facing away from the brake disc, with a cap.

The guide bush itself, including the elastomer bearing sleeve, is however exposed, wherein in particular in the case of use in vehicles which are used on unsurfaced or very dirty roads, stone impacts and contamination with dirt can result in damage to the guide bush, and the entry of dirty water into the guide region. This results in increased bearing wear, which necessitates early replacement of the guide bush and possibly of the guide bar. This is naturally associated with considerable cost expenditure, not least on account of the required interruption in service of the vehicle.

The invention is therefore based on the object of further developing a disc brake such that the service life is increased, even under extreme operating conditions, with little expenditure in terms of design and production.

This and other objects are achieved according to the invention by providing a disc brake for a utility or commercial vehicle having a brake caliper, which surrounds a brake disc and which is fastened to a positionally fixed brake carrier by two fastening elements so as to be axially movable in relation to the brake disc. The fastening elements have, in each case, one guide bar which is fixedly connected to the brake carrier. For the axial mobility of the brake caliper, one guide bar is guided in a plain bearing which is embodied as a fixed bearing, and the other guide bar is guided in a plain bearing which is embodied as a floating bearing. At least the floating bearing has (i) a guide bush, which engages around the guide bar and is connected to the brake caliper so as to be immovable, (ii) an elastomer bearing sleeve, and (iii) a cap which covers the guide bar on its end side facing away from the brake disc. The cap is fastened, so as to cover the guide bush at the end side, to the elastomer bearing sleeve at least in an axial partial region at an outer side.

With little production expenditure, sealing is now obtained of the sliding region between the guide bush and the guide bar, which concomitantly encloses the elastomer guide bush. It is thus possible to refer to hermetic sealing of the plain bearing, by which operational wear, caused for example by contamination and stone impacts, can be eliminated.

This naturally leads to a reduction in operating costs of the utility vehicle which is used, since corresponding repair intervals are lengthened significantly.

Furthermore, disc brakes which are already in operation may be retrofitted with floating bearings according to the invention in the event of repairs being carried out.

According to one advantageous refinement of the invention, provision is made for the cap to be attached to the brake caliper, with the attachment region of the cap preferably being designed as an encircling, radially outwardly aligned collar, which can rest in a depression of the brake caliper.

Provision is also made for the cap to be connected in a positively locking and/or frictionally locking manner to the guide bush.

Here, the cap may bear in a frictionally locking manner against the elastomer bearing sleeve. It is however also contemplated for the cap to alternatively or additionally be connected to a metal sleeve which surrounds the elastomer bearing sleeve. The metal sleeve is also encapsulated in regions by the elastomer bearing sleeve.

The connection of the cap to the metal sleeve, which is preferably composed of steel, takes place by an interference fit, while the contact of the elastomer bearing sleeve against the cap takes place by encircling, integrally formed lips, which bear under deformation against the inner wall of the cap.

In combination with the interference fit of the metal sleeve, reliable sealing of the floating bearing is thus obtained in a simple manner by way of the cap.

Further advantageous refinements of the invention are described herein.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a disc brake in a schematic plan view;

FIG. 2 is a partial section view of the disc brake as per the label "A" in FIG. 1; and FIG. 3 is an enlarged partial section view of a detail of the disc brake corresponding to the label III in FIG. 2.

DETAILED DESCRIPTION OF THE DRAWINGS

FIG. 1 illustrates a disc brake, in particular for a utility or commercial vehicle, which disc brake, in terms of its basic design, has a brake caliper 2 which straddles a brake disc 3 fastened to an axle (not illustrated) of the vehicle.

The brake caliper 2 is arranged on a brake carrier 1 of the utility vehicle so as to be axially movable in relation to the brake disc 3. For this purpose, two fastening elements, including a fixed bearing 4 and a floating bearing 5, are provided, which fastening elements have, in each case, one guide bar 10 fixedly connected to the brake carrier 1 (FIG. 2), by being fastened to the brake carrier 1 by way of a screw 11.

Figure 2:
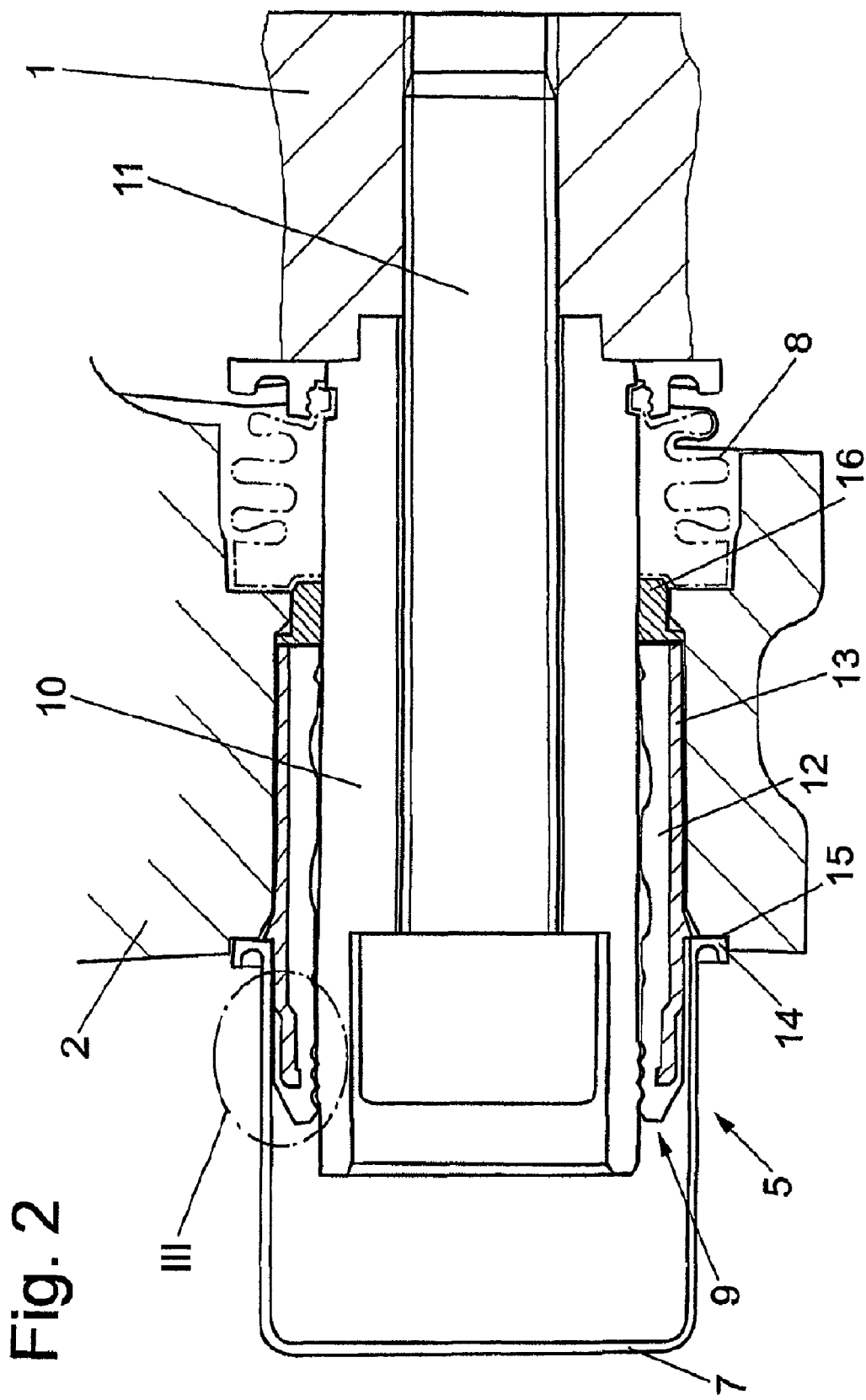

FIG. 2 illustrates an exemplary embodiment of the floating bearing 5. The floating bearing 5 includes a guide bush 9 engaging around the guide bar 10 and being connected to the brake caliper 2 so as to be immovable. An elastomer bearing sleeve 12 bears against the guide bar 10.

Figure 3:
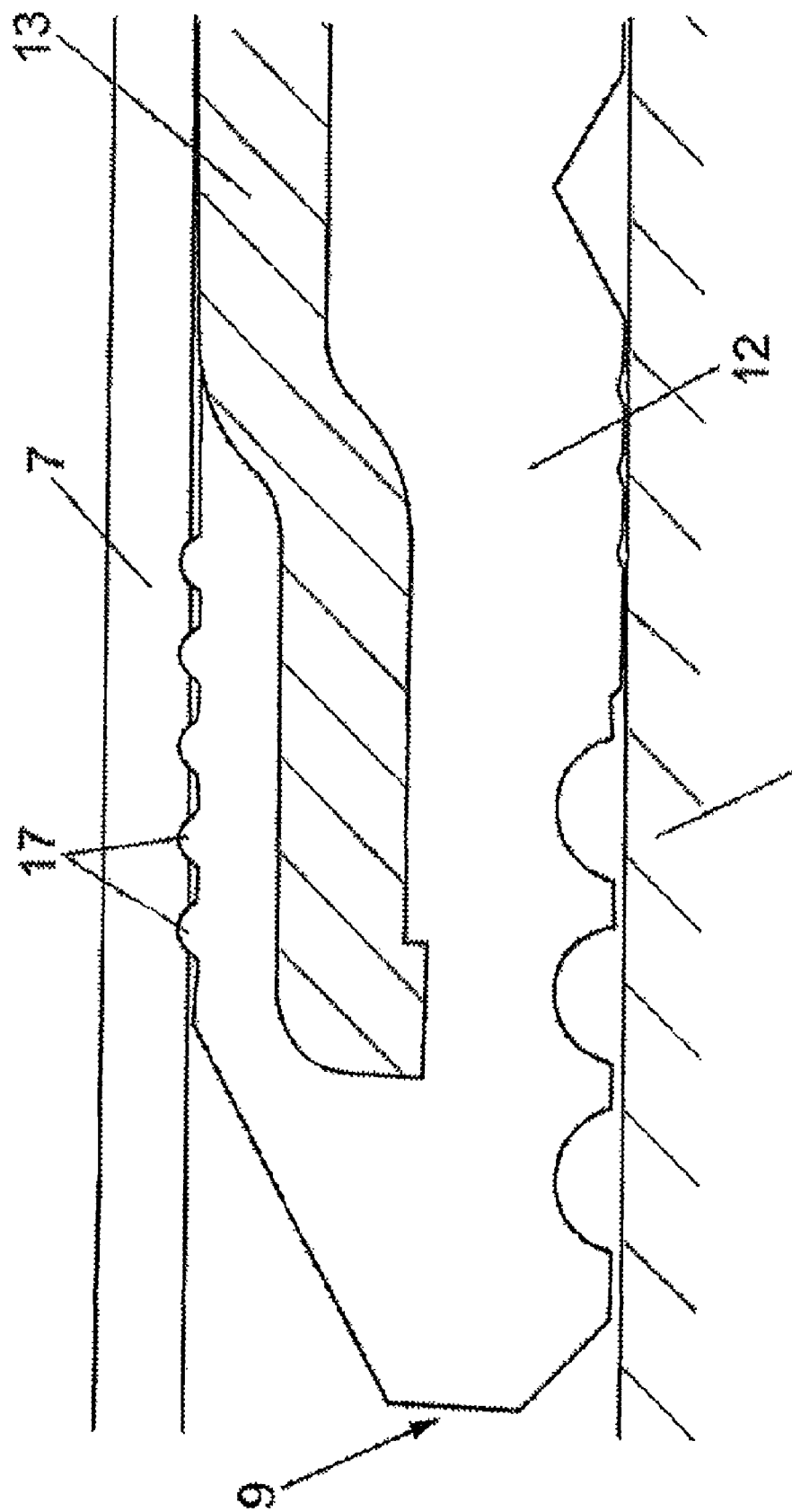

At an outer side, the elastomer bearing sleeve 12 is encased by a metal sleeve 13, which is connected thereto and which is encapsulated by the elastomer bearing sleeve 12 in regions, as can be seen particularly clearly from FIG. 3.

On the side facing away from the brake disc 3, the end sides of the guide bar 10 and of the guide bush 9 are covered by a cap 7, which cap is fastened in a positively locking and/or frictionally locking manner to the guide bush 9.

On its open side facing toward the brake caliper 2, the cap 7 has an encircling, radially outwardly extending collar 14, which rests in a depression 15 of the brake caliper 2.

At an end facing away from the cap 7, the guide bush 9 bears against a stop ring 16, which is supported in the brake caliper 2 and which serves to limit a maximum compression of the elastomer bearing sleeve 12 in the event of externally acting forces.

The region, which faces toward the brake disc 3, between a holding bore, which holds the guide bush 9, and the guide bar 10, which projects with respect to the guide bush 9, is sealed off by a bellows 8.

FIG. 3 illustrates an enlarged section of the connection of the cap 7 to the guide bush 9. It can be seen that the metal sleeve 13 has a constricted end region which is embedded by encapsulation into the elastomer bearing sleeve 12.

On the outer side facing toward the cap 7, the elastomer bearing sleeve 12 is provided, in the region which covers the constriction, with encircling lips 17 which, before the cap 7 is placed on, project with respect to the larger diameter of the metal sleeve 13.

To fasten the cap 7 to the guide bush 9, the cap 7 is pressed together with the metal sleeve 13 in the region of the larger diameter, while the lips 17 bear under elastic deformation, corresponding to their restoring forces, against the inner wall of the cap 7. In this way, a connection which is both secure and sealed is ensured between the cap 7 and the guide bush 9.

| Table of reference symbols | |
|---|---|
| 1 | Brake carrier |
| 2 | Brake caliper |
| 3 | Brake disc |
| 4 | Fixed bearing |
| 5 | Floating bearing |
| 7 | Cap |
| 8 | Bellows |
| 9 | Guide bush |
| 10 | Guide bar |
| 11 | Screw |
| 12 | Elastomer bearing sleeve |
| 13 | Metal sleeve |
| 14 | Collar |
| 15 | Depression |
| 16 | Stop ring |
| 17 | Lip |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, the disc brake comprising:
    a caliper which, in use, straddles the brake disc;
    a positionally fixed carrier;
    two fastening elements operatively configured to fasten the caliper to the carrier so as to be axially moveable in relation to the brake disc;
    each fastening element having a guide bar fixedly connected to the carrier, one guide bar being guided in a plain bearing embodied as a fixed bearing and the other guide bar being guided in a plain bearing embodied as a floating bearing;
    wherein at least the floating bearing comprises a guide bush with an elastomer bearing sleeve, the guide bush engaging around the guide bar and being immovably connected to the caliper; and
    wherein a cap covers an end side of the guide bar facing away from the brake disc, said cap resting at its open end against the caliper and being fastened to the elastomer bearing sleeve at least in an axial partial region at an outer side of the elastomer bearing sleeve in order to cover both an end side of the guide bush and a sleeve encasing the elastomer bearing sleeve.

2. The disc brake as claimed in claim 1, wherein the sleeve encasing the elastomer bearing sleeve is a metal sleeve encasing outer regions of the elastomer bearing sleeve.

3. The disc brake as claimed in claim 2, wherein the metal sleeve has, on a side facing toward the cap, a peripherally constricted region embedded into the elastomer bearing sleeve.

4. The disc brake as claimed in claim 1, wherein the cap is held in at least one of a positively locking and frictionally locking manner in a partial region of an outer wall of the elastomer bearing sleeve.

5. The disc brake as claimed in claim 4, wherein the cap is pressed onto the metal sleeve.

6. The disc brake as claimed in claim 3, wherein a region of the elastomer bearing sleeve which covers the constriction of the metal sleeve is provided, on an outer side facing toward the cap, with at least one encircling lip which bears under elastic deformation against an inner wall of the cap.

7. The disc brake as claimed in claim 1, wherein the cap has a radially outwardly extending encircling collar which bears against the caliper.

8. The disc brake as claimed in claim 2, wherein the cap has a radially outwardly extending encircling collar which bears against the caliper.

9. The disc brake as claimed in claim 7, wherein the collar rests in a depression of the caliper.

10. The disc brake as claimed in claim 1, wherein the guide bush bears, with an end side situated opposite the cap, against a stop ring held in the brake caliper.

* * * * *